(12) United States Patent
Chen

(10) Patent No.: US 12,531,921 B2
(45) Date of Patent: Jan. 20, 2026

(54) METHODS AND SYSTEMS FOR STREAMING MEDIA CONTENT

(71) Applicant: Adeia Guides Inc., San Jose, CA (US)

(72) Inventor: Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/122,241

(22) Filed: Mar. 16, 2023

(65) Prior Publication Data

US 2024/0022623 A1    Jan. 18, 2024

Related U.S. Application Data

(63) Continuation of application No. 17/867,442, filed on Jul. 18, 2022, now Pat. No. 11,632,413.

(51) Int. Cl.
*H04L 65/80* (2022.01)
*H04L 65/752* (2022.01)

(52) U.S. Cl.
CPC ............ *H04L 65/80* (2013.01); *H04L 65/752* (2022.05)

(58) Field of Classification Search
CPC ..... H04L 65/80; H04L 65/752; H04L 65/762; H04L 65/612; H04N 21/23439;
(Continued)

(56) References Cited

U.S. PATENT DOCUMENTS 8,156,138 B2    4/2012 Kohn et al.
9,324,375 B1 *  4/2016 Casalena ............... G11B 27/038
(Continued)

FOREIGN PATENT DOCUMENTS

CN    105451075 B         7/2018
DE    69830625 T2 *       5/2006    ......... H04L 12/5602
(Continued)

OTHER PUBLICATIONS

Bai , et al., Bai et al., "Video quality temporal pooling using a visibility measure," Proceedings of IEEE International Conference on Multimedia and Expo (ICME) 2019.
(Continued)

*Primary Examiner* — Oanh Duong
(74) *Attorney, Agent, or Firm* — HALEY GUILIANO LLP

(57) ABSTRACT

Systems and methods are described for streaming media content. A first portion of a media content item is received at a bandwidth available to a user device, wherein the quality of the first portion is based on the bandwidth available. A second portion of the media content item is received at a decreased or increased bandwidth, wherein the quality of the second portion is based on the increased or decreased bandwidth available to the user device. The quality of the first portion and the second portion is determined. In response to determining that the quality of the second portion received at the decreased bandwidth is less than a quality threshold, the quality of the first portion of the media content item is reduced prior to sending the first portion to a playback buffer. In response to determining that the quality of the second portion received at the increased bandwidth is more than a quality threshold, the quality of the second portion of the media content item is reduced prior to sending the second portion to a playback buffer.

20 Claims, 9 Drawing Sheets

(58) Field of Classification Search
CPC ......... H04N 21/2402; H04N 21/44016; H04N 21/4402; H04N 21/440263; H04N 21/440281; H04N 21/44029; H04N 21/442; H04N 21/4621; H04N 21/8456

See application file for complete search history.

(56) References Cited

U.S. PATENT DOCUMENTS

| | | | |
|---|---|---|---|
| 9,756,101 B2 * | 9/2017 | Glynn | H04L 65/60 |
| 9,942,577 B1 * | 4/2018 | Burford | H04L 65/612 |
| 10,116,719 B1 * | 10/2018 | Li | H04L 65/752 |
| 10,244,016 B1 * | 3/2019 | Binns | H04L 65/765 |
| 10,250,917 B1 | 4/2019 | Nijim et al. | |
| 10,341,693 B2 | 7/2019 | Barr et al. | |
| 10,536,500 B2 | 1/2020 | Halepovic et al. | |
| 10,542,315 B2 | 1/2020 | Shaw et al. | |
| 10,735,489 B1 * | 8/2020 | Joliveau | H04L 65/1083 |
| 11,201,904 B2 | 12/2021 | Stumbo | |
| 11,374,998 B1 | 6/2022 | Halepovic et al. | |
| 11,470,355 B1 | 10/2022 | Persiantsev | |
| 11,632,413 B1 | 4/2023 | Chen | |
| 12,063,260 B2 | 8/2024 | Chen et al. | |
| 2002/0040320 A1 | 4/2002 | Tanaka | |
| 2005/0244064 A1 * | 11/2005 | Hentschel | H04N 21/44008 375/E7.011 |
| 2008/0043643 A1 | 2/2008 | Thielman et al. | |
| 2009/0281923 A1 | 11/2009 | Selinger et al. | |
| 2011/0179114 A1 | 7/2011 | Dilip et al. | |
| 2012/0117225 A1 * | 5/2012 | Kordasiewicz | H04N 17/004 709/224 |
| 2012/0331106 A1 | 12/2012 | Ramamurthy et al. | |
| 2013/0155068 A1 | 6/2013 | Bier et al. | |
| 2013/0179440 A1 | 7/2013 | Gordon | |
| 2013/0185158 A1 | 7/2013 | Feng et al. | |
| 2013/0282917 A1 | 10/2013 | Reznik et al. | |
| 2013/0332438 A1 | 12/2013 | Li et al. | |
| 2014/0006951 A1 | 1/2014 | Hunter | |
| 2014/0095943 A1 | 4/2014 | Kohlenberg et al. | |
| 2014/0223481 A1 | 8/2014 | Fundament | |
| 2014/0241415 A1 | 8/2014 | Su et al. | |
| 2014/0289764 A1 | 9/2014 | Mallika | |
| 2014/0297666 A1 | 10/2014 | Morris | |
| 2014/0365675 A1 | 12/2014 | Bhardwaj et al. | |
| 2015/0163273 A1 * | 6/2015 | Radcliffe | H04L 43/0894 709/231 |
| 2015/0169701 A1 | 6/2015 | Stekkelpak et al. | |
| 2015/0256581 A1 | 9/2015 | Kolhi et al. | |
| 2015/0296047 A1 | 10/2015 | Ghazisaidi | |
| 2016/0012795 A1 | 1/2016 | Banski et al. | |
| 2016/0065995 A1 | 3/2016 | Phillips | |
| 2016/0205162 A1 * | 7/2016 | Zhang | H04L 65/80 709/231 |
| 2016/0360262 A1 | 12/2016 | Matejka et al. | |
| 2017/0034024 A1 | 2/2017 | Dushyanthan et al. | |
| 2017/0302717 A1 | 10/2017 | Karlsson et al. | |
| 2017/0346871 A1 | 11/2017 | Zanger et al. | |
| 2017/0353776 A1 | 12/2017 | Holden et al. | |
| 2017/0374121 A1 | 12/2017 | Phillips et al. | |
| 2018/0041788 A1 * | 2/2018 | Wang | H04N 21/23805 |
| 2018/0054651 A1 | 2/2018 | Mallika | |
| 2018/0109468 A1 | 4/2018 | Sridhar et al. | |
| 2018/0115475 A1 * | 4/2018 | Broom | H04L 65/61 |
| 2019/0334824 A1 | 10/2019 | Jana et al. | |
| 2019/0387426 A1 | 12/2019 | Lee | |
| 2020/0036768 A1 | 1/2020 | Bedi et al. | |
| 2020/0077132 A1 | 3/2020 | Sivaramalingam et al. | |
| 2020/0120150 A1 | 4/2020 | Bongaarts et al. | |
| 2020/0177660 A1 | 6/2020 | Connor et al. | |
| 2020/0304885 A1 | 9/2020 | Ickin | |
| 2020/0351201 A1 | 11/2020 | Li et al. | |
| 2021/0136435 A1 | 5/2021 | Stobbart | |
| 2021/0152892 A1 * | 5/2021 | Ramaswamy | H04N 21/25825 |
| 2021/0321149 A1 | 10/2021 | Tan et al. | |
| 2021/0352341 A1 * | 11/2021 | Pahalawatta | H04N 21/2343 |
| 2021/0374324 A1 * | 12/2021 | Rimmer | H04L 67/02 |
| 2022/0240340 A1 | 7/2022 | Xu et al. | |
| 2022/0303856 A1 | 9/2022 | Chari et al. | |
| 2022/0374197 A1 | 11/2022 | Carrigan | |
| 2023/0133880 A1 | 5/2023 | Paliwal et al. | |
| 2023/0247205 A1 * | 8/2023 | Gillis | H04N 19/146 375/240.03 |
| 2023/0275943 A1 | 8/2023 | Suryavanshi et al. | |
| 2024/0073268 A1 | 2/2024 | Chen et al. | |
| 2024/0073481 A1 | 2/2024 | Chen et al. | |
| 2024/0298052 A1 | 9/2024 | Terem et al. | |

FOREIGN PATENT DOCUMENTS

| | | | |
|---|---|---|---|
| EP | 2615790 A1 | 7/2013 | |
| WO | 2007130879 A2 | 11/2007 | |
| WO | 2013043923 A1 | 3/2013 | |
| WO | WO-2014011848 A2 * | 1/2014 | ........... H04L 65/601 |
| WO | 2016151974 A1 | 9/2016 | |

OTHER PUBLICATIONS

Bampis , et al., Bampis et al., "Towards perceptually optimized adaptive video streaming—A realistic quality of experience database," IEEE Transactions on Image Processing, vol. 30, pp. 5182-5197 (2021).

Duanmu , et al., Duanmu et al., "Quality-of-Experience for adaptive streaming videos: An expectation confirmation theory motivaed approach," IEEE Transactions on Image Processing, vol. 27, No. 12 pp. 6135-6146 (2018).

Rodriguez , et al., Rodriguez et al., "the impact of video-quality-level switching on user quality of experience in dynamic adaptive streaming over HTTP," EURASIP Journal on Wireless Communications and Networking, 2014:216 (2014).

Tavakoli , et al., Tavakoli et al., "Perceptual quality of HTTP adaptive streaming strategies: Cross-experimental analysis of multi-laboratory and crowdsourced subjective studies," IEEE Journal on Selected Areas in Communications, vol. 34, No. 8, pp. 2141-2153 (2016).

Tu , et al., Tu et al., "A comparative evaluation of temporal pooling methods for blind video quality assessment," Proceedings of IEEE International Conference on Image Processing (ICIP) 2020.

Mok, R. K. P. , et al., "QDASH: A QoE-aware DASH system," Proceeding MMYsys '12 Proceedings of the 3rd Multimedia Systems Conference, 11-22 (2012).

U.S. Appl. No. 19/213,455, filed May 20, 2025, Tao Chen.

\* cited by examiner

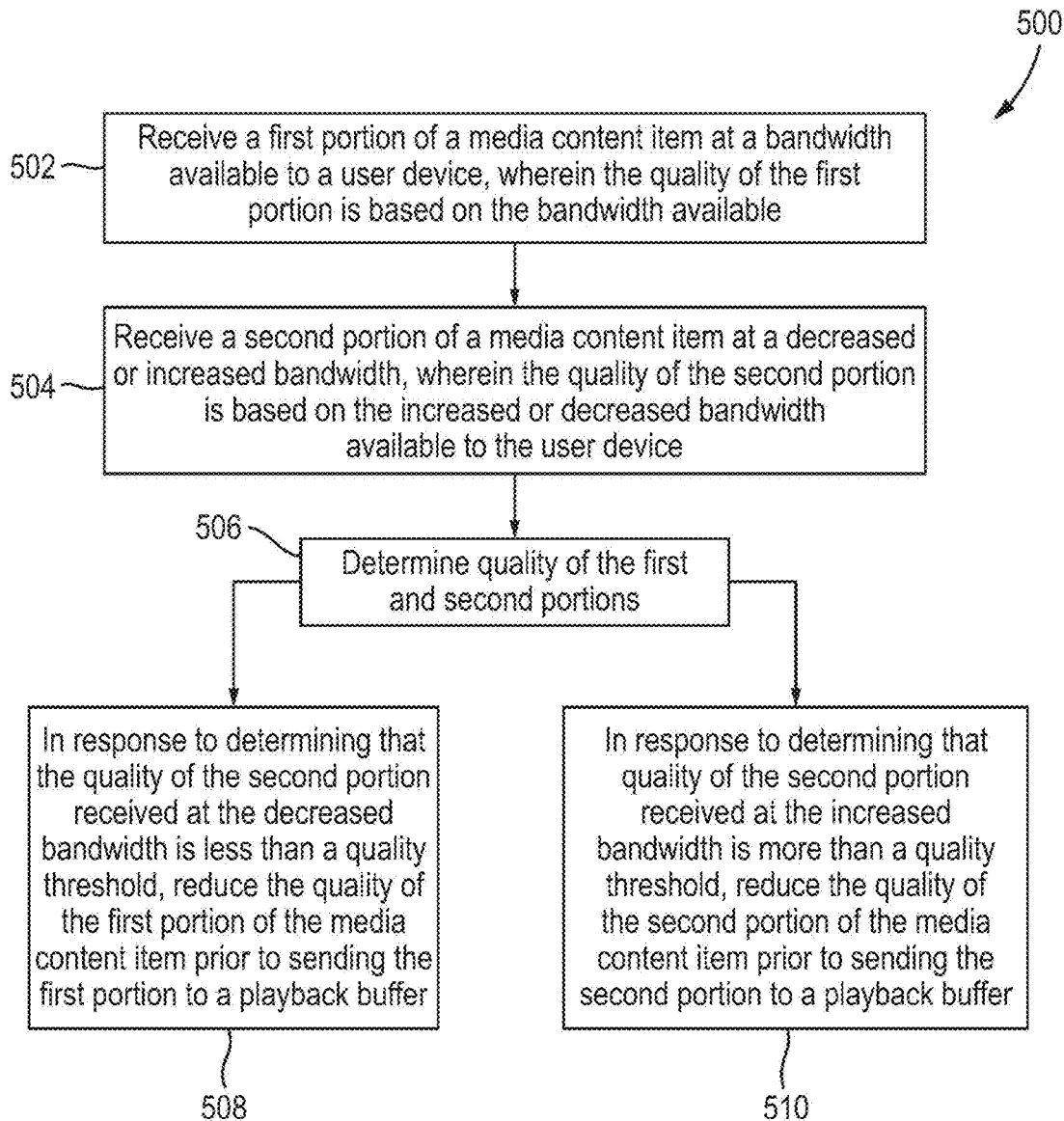

METHODS AND SYSTEMS FOR STREAMING MEDIA CONTENT

CROSS REFERENCE TO RELATED APPLICATIONS

This application is a continuation of U.S. patent application Ser. No. 17/867,442, filed Jul. 18, 2022, the disclosures of which is hereby incorporated by reference herein in its entirety.

BACKGROUND

The present disclosure relates to methods and systems for streaming media content. Particularly, but not exclusively, the present disclosure relates to managing transitions in the quality of a streamed media content item as a result of variations in bandwidth.

SUMMARY

Adaptive bitrate (ABR) streaming is a technique used in streaming multimedia over computer networks. Current adaptive streaming technologies are based on HTTP and designed to work efficiently over large distributed HTTP networks such as the Internet. ABR streaming works by detecting a bandwidth at a client (e.g., user device) and adjusting the quality of the media stream accordingly, e.g., in real time. For example, the client may switch between streaming different quality encodings of a media content item depending on available resources, which can lead to very little buffering, fast start time and a good experience for both high-end and low-end connections. However, while fluctuations of a network bandwidth will lead to automatic upgrade or downgrade of the bitrate and quality in real-time, such time-varying quality has an impact on video quality of experience (QoE). This impact is a function of variables such as the frequency of occurrence of quality changes and when the quality change occurs, e.g., in the middle of a scene. This in turn provides implications for service providers, since variation in playback quality is one of the worst offenders to the viewing QoE.

Systems and methods are provided herein for improving viewing QoE when streaming media content, e.g., using ABR streaming. Such systems and methods may provide an improved experience for the user, e.g., by providing a smoother transition between changes in picture quality as a result of an increase or decrease in the bandwidth available to a user device streaming the media content.

According to some examples of the systems and methods provided herein, a first portion of a media content item, e.g., one or more scenes, segments and/or frames, is received at a bandwidth available to a user device, wherein the quality of the first portion is based on the bandwidth available. A second portion of the media content item is received at a decreased or increased bandwidth, wherein the quality of the second portion is based on the increased or decreased bandwidth available to the user device. In some examples, the user device accesses a manifest file to determine which quality to request based on a current bit rate available to the user device. The quality of each of the first portion and the second portion is determined, e.g., based on information in the manifest file and/or information embedded in the stream, or otherwise. In some examples, in response to determining that the quality of the second portion received at the decreased bandwidth is less than a quality threshold, the quality of the first portion of the media content item is reduced, e.g., by processing at the user device, prior to sending the first portion to a playback buffer. In some examples, in response to determining that the quality of the second portion received at the increased bandwidth is more than a quality threshold, the quality of the second portion of the media content item is reduced, e.g., by processing at the user device, prior to sending the second portion to a playback buffer.

In some examples, a reduction in the quality of the first and/or second portion is performed based on analysis of the quality of the playback of the media content item in a period preceding the increased or decreased picture quality of decoded data, e.g., as a result of a change in the bandwidth available to the user device. For example, the user device may comprise a QoE module, and/or have access to a QoE module, e.g., provided on a server, that determines whether it is appropriate to carry out a quality reduction process on the first and/or second portion.

In some examples, the user device is configured to decode each of the first and second portions. In some examples, the user device is configured to store each of the decoded first and second portions in a buffer. In some examples, determining the quality of the first portion and the second portion comprises determining a resolution of each of the decoded first and second portions. In some examples, determining the quality of the first portion and the second portion comprises determining a visual quality assessment of each of the decoded first and second portions.

In some examples, wherein the quality threshold comprises a target resolution. For example, the target resolution may be an average target resolution for the display of the media content item on the user device.

In some examples, the quality threshold comprises a threshold quality difference between the quality of the first or second portion and the target resolution. The quality of the first or second portion may be reduced in response to determining that the difference between the quality of the first or second portions is greater than the threshold quality difference.

In some examples, the quality threshold comprises a threshold quality difference between the quality of the first portion and the quality of the second portion. A difference between the quality of the first portion and the quality of the second portion may be determined. In response to determining that the difference between the quality of the first portion and the quality of the second portion is greater than the threshold quality difference, the quality of the first or second portion may be reduced.

In some examples, the quality threshold is based on a type of media content item, e.g., the genre of the media content item, and/or whether the media content item is being streamed live or is pre-recorded. In some examples, the quality threshold is based on one or more user preferences. In some examples, the quality threshold is based on historical fluctuations in the bandwidth available to the user device. In some examples, the quality threshold is based on one or more parameters of the user device, such as a computational capacity, and/or a size/shape of a display screen.

In some examples, reducing the quality of the first or second portion comprises applying a bandwidth reduction and/or a sample rate reduction to a decoded first or second portion.

In some examples, the bandwidth available to the user device may be monitored, e.g., as a function of time, and/over a predetermined period. In some examples, a time at which a switch in playback quality will occur as a result of the bandwidth available to the user device increasing or decreasing is determined. A quality reduction profile to apply to the reduction in the quality of the first or second portion may be determined based on the time. In some examples, a first time at which the bandwidth available to the user device increases or decreases may be determined. In some examples, a second time at which a switch in playback quality can occur is determined. In some examples, a quality reduction profile to apply to the reduction in the quality of the first or second portion is determined, e.g., based on the first time and/or the second time. In some examples, the quality reduction profile is based on at least one of: an amount of the first or second portion in a buffer; a period between the first time and the second time; a type of the media content item; a number of scenes, segments or frames of the first or second portion; an interframe coding of the first or second portion; and/or an operational parameter of the user device.

In some examples, the quality of a decoded media content item stored in a buffer, e.g., the playback buffer is monitored. The duration of the media content item available at each of a first quality and a second quality in the buffer may be determined. In some examples, a time at which playback will switch from playback of a first portion at a first quality to playback of a second portion at a second quality is determined. In response to determining the time at which playback will switch, the quality of at least some of the received first and/or second portion is modified, e.g., by processing at least some of decoded first and/or second portions stored in a buffer.

In some examples, a media content item having a target quality based on the bandwidth available is buffered, an increase or decrease in the bandwidth available to the user device causes the quality of the buffered media content item to change, and, in response to determining a change in the quality of the media content item, reducing the quality of at least a portion of the buffered media content item.

In some examples, a first portion of a media content item is buffered at a bandwidth available to a user device, wherein the quality of the first portion is based on the bandwidth available, a second portion of the media content item is buffered at a decreased or increased bandwidth, wherein the quality of the second portion is based on the increased or decreased bandwidth available, and when the quality of the first portion is greater than the quality of the second portion, the quality of the first portion of the media content item is reduced prior to playback at the user device, or when the quality of the first portion is less than the quality of the second portion, the quality of the second buffered portion of the media content item is reduced prior to playback at the user device.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5 is a flowchart representing a process for streaming media content, in accordance with some examples of the disclosure;

DETAILED DESCRIPTION

Figure 1:
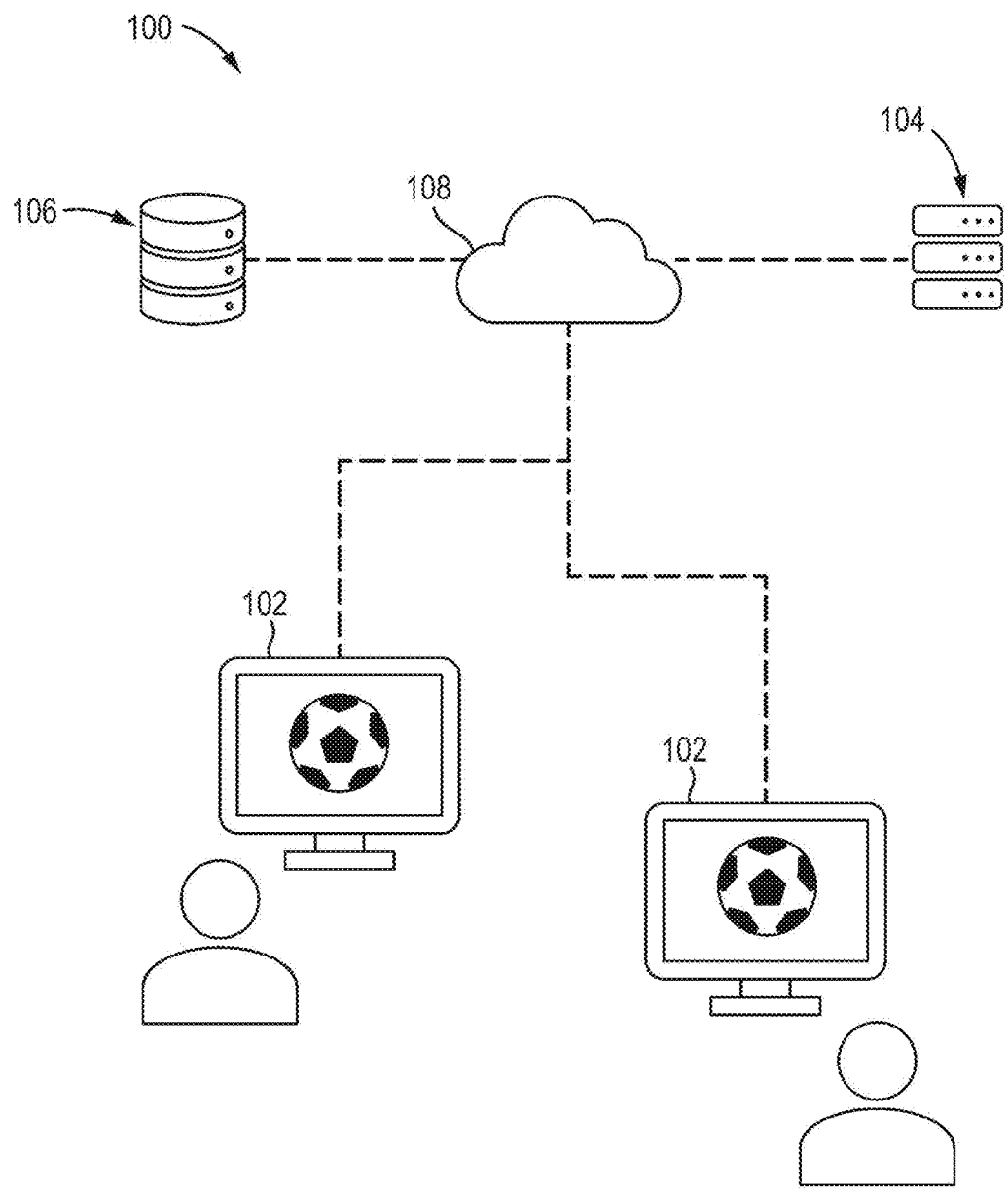
FIG. 1 illustrates an overview of a system for streaming media content, in accordance with some examples of the disclosure.

FIG. 1 illustrates an overview of a system 100 for streaming media content, in which a media content item is streamed to one or more user devices 102. In particular, the example shown in FIG. 1 illustrates two users viewing a soccer game being streamed over a network, such as the Internet. However, the present disclosure is not limited to such, and is applicable to all types of media content, such as music, TV programs, movies, video conferences, and lectures, for example, that may be streamed to a user device.

In the example shown in FIG. 1, system 100 includes one or more user devices 102, such as a tablet computer, a smartphone, a smart television, or the like, configured to display media content to one or more respective users. System 100 may also include network 108 such as the Internet, configured to communicatively couple user devices 102 to one or more servers 104 and/or one or more content databases 106 from which media content, such as TV shows, movies and/or advertisement content, may be obtained for display on the user devices 102. User devices 102 and the one or more servers 104 may be communicatively coupled to one another by way of network 108, and the one or more servers 104 may be communicatively coupled to content database 106 by way of one or more communication paths, such as a proprietary communication path and/or network 108. In some examples, server 104 may be a server of a service provider who provides media content for display on user devices 102.

In some examples, system 100 may comprise an application that provides guidance through an interface, e.g., a graphical user interface, that allows users to efficiently navigate media content selections, navigate an interactive media content item, and easily identify media content that they may desire, such as content provided on a database on one or more live streams. Such guidance is referred to herein as an interactive content guidance application or, sometimes, a content guidance application, a media guidance application, or a guidance application.

With the ever-improving capabilities of the Internet, mobile computing, and high-speed wireless networks, users are accessing media on user equipment devices on which they traditionally did not. As referred to herein, the phrases "user equipment device," "user equipment," "user device," "computing device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some examples, the user equipment device may have a front-facing screen and a rear-facing screen, multiple front screens, or multiple angled screens. In some examples, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available through both a television and one or more of the other types of user equipment devices. The media guidance applications may be provided as online applications (i.e., provided on a website), or as stand-alone applications or clients on user equipment devices. Various devices and platforms that may implement media guidance applications are described in more detail below.

Figure 2:
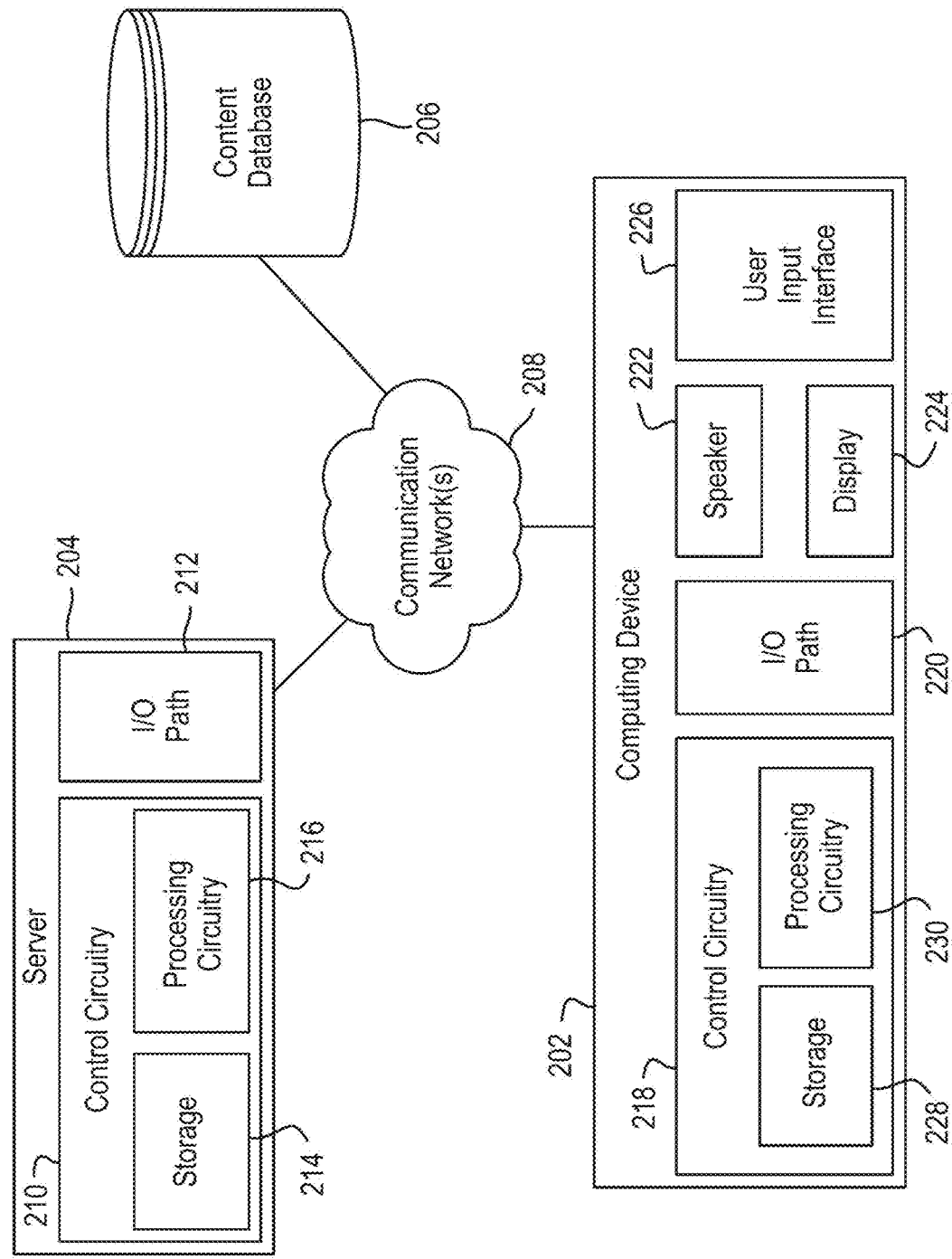
FIG. 2 is a block diagram showing components of an exemplary system for operating a group watching session, in accordance with some examples of the disclosure.

FIG. 2 is an illustrative block diagram showing exemplary system 200 configured to display media content. Although FIG. 2 shows system 200 as including a number and configuration of individual components, in some examples, any number of the components of system 200 may be combined and/or integrated as one device, e.g., as user device 102. System 200 includes computing device 202 (e.g., user device 102), server 204 (e.g., server 104), and content database 206 (e.g., content database 106), each of which is communicatively coupled to communication network 208 (e.g., network 108), which may be the Internet or any other suitable network or group of networks. In some examples, system 200 excludes server 204, and functionality that would otherwise be implemented by server 204 is instead implemented by other components of system 200, such as computing device 202. In still other examples, server 204 works in conjunction with computing device 202 to implement certain functionality described herein in a distributed or cooperative manner.

Server 204 includes control circuitry 210 and input/output (hereinafter "I/O") path 212, and control circuitry 210 includes storage 214 and processing circuitry 216. Computing device 202, which may be a personal computer, a laptop computer, a tablet computer, a smartphone, a smart television, a smart speaker, or any other type of computing device, includes control circuitry 218, I/O path 220, speaker 222, display 224, and user input interface 226, which in some examples provides a user selectable option for enabling and disabling the display of modified subtitles. Control circuitry 218 includes storage 228 and processing circuitry 220. Control circuitry 210 and/or 218 may be based on any suitable processing circuitry such as processing circuitry 216 and/or 220. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, storage 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, storage 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 214 and/or 228 may be instructed by the application to perform the functions discussed herein. In some implementations, any action performed by control circuitry 214 and/or 228 may be based on instructions received from the application. For example, the application may be implemented as software or a set of executable instructions that may be stored in storage 214 and/or 228 and executed by control circuitry 214 and/or 228. In some examples, the application may be a client/server application where only a client application resides on computing device 202, and a server application resides on server 204.

The application may be implemented using any suitable architecture. For example, it may be a stand-alone application wholly implemented on computing device 202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server 204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server 204). For example, the remote server may store the instructions for the application in a storage device. The remote server may process the stored instructions using circuitry (e.g., control circuitry 210) and/or generate displays. Computing device 202 may receive the displays generated by the remote server and may display the content of the displays locally via display 224. This way, the processing of the instructions is performed remotely (e.g., by server 204) while the resulting displays, such as the display windows described elsewhere herein, are provided locally on computing device 202. Computing device 202 may receive inputs from the user via input interface 226 and transmit those inputs to the remote server for processing and generating the corresponding displays.

A user may send instructions, e.g., to view an interactive media content item and/or select one or more programming options of the interactive media content item, to control circuitry 210 and/or 218 using user input interface 226. User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server 204 and computing device 202 may transmit and receive content and data via I/O path 212 and 220, respectively. For instance, I/O path 212 and/or I/O path 220 may include a communication port(s) configured to transmit and/or receive (for instance to and/or from content database 206), via communication network 208, content item identifiers, content metadata, natural language queries, and/or other data. Control circuitry 210, 218 may be used to send and receive commands, requests, and other suitable data using I/O paths 212, 220.

Figure 3A:
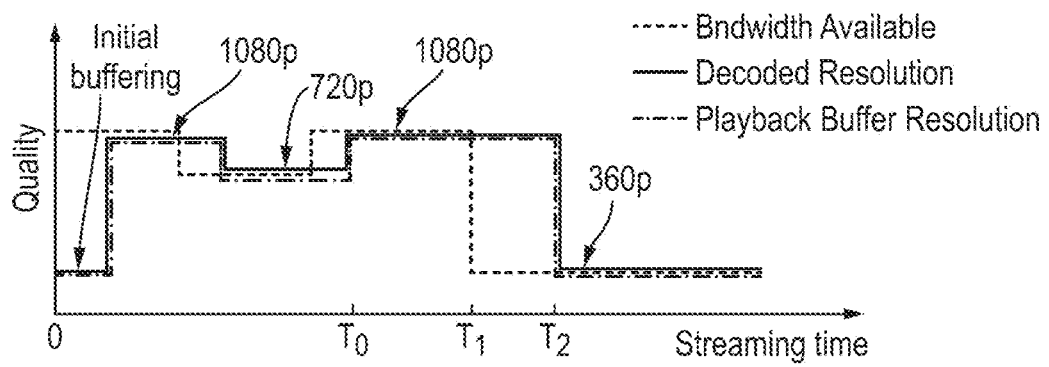
FIG. 3A illustrates a diagrammatic representation of quality variation during playback of a media content item.
Figure 3B:
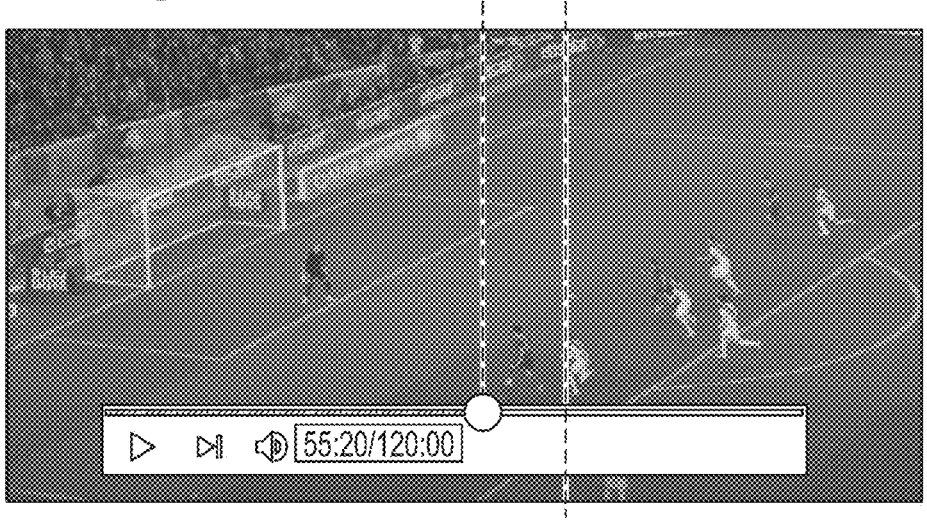
FIG. 3B illustrates high quality playback of a media content item.
Figure 3C:
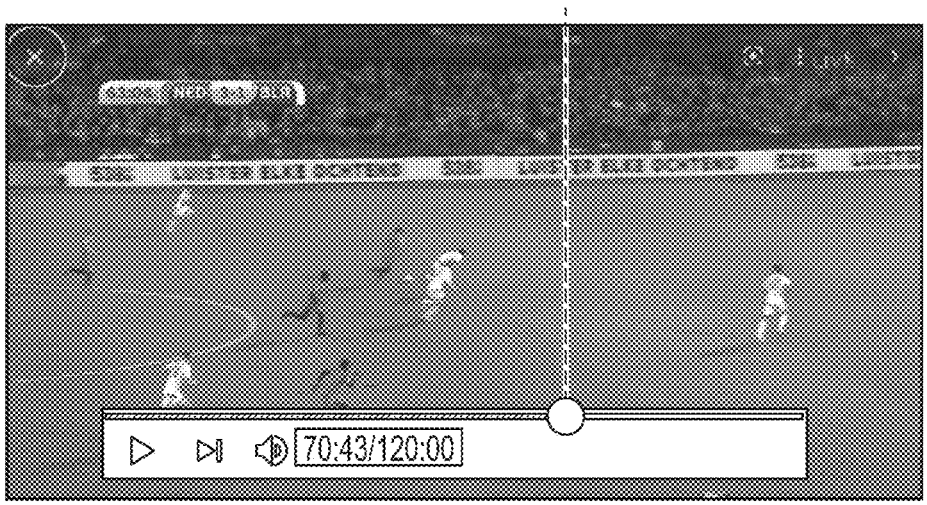
FIG. 3C illustrates low quality playback of a media content item.

FIGS. 3A-3C illustrate variation in playback quality at user device 102 based on one or more parameters relating to the operation of the user device 102. For example, a parameter relating to the operation of the user device 102 (an "operational parameter") may relate to a bandwidth available to the user device 102, e.g., a speed of network 108 may fluctuate based on the number of devices coupled to the network. Additionally or alternatively, an operational parameter may relate to computing capacity of user device 102, e.g., a processing capacity of user device 102 may be affected by the number of processes that the user device 102 is performing. While the below examples describe variations in the quality of streamed media content as a result of a bandwidth available to a user device, it is understood that the disclosure is not limited to such, and the systems and methods described below may provide improved transition between media content item segments of different quality, irrespective of the streaming technique implemented to increase or decrease the quality of the media content item displayed on the user device.

Figure 4:
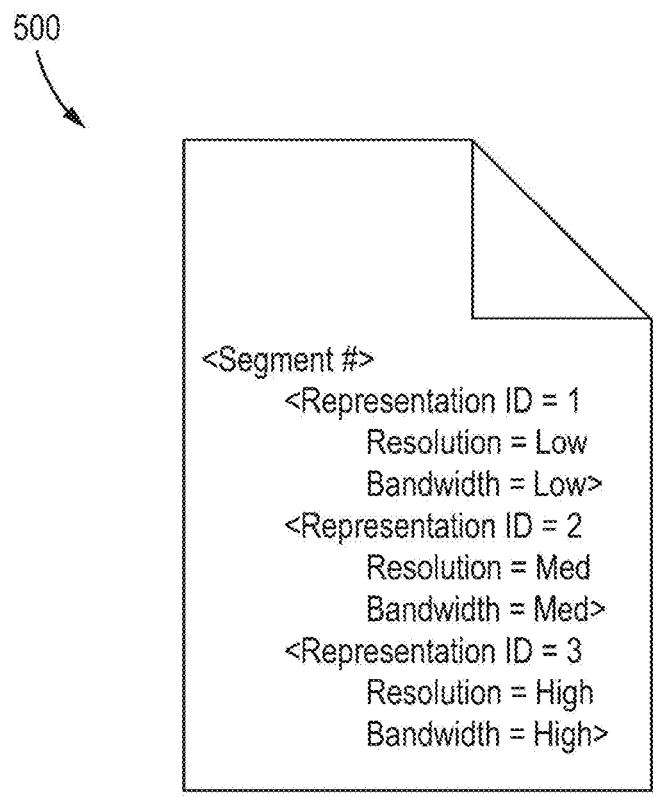
FIG. 4 illustrates a diagrammatic representation of a manifest file, in accordance with some examples of the disclosure.

More specifically, ABR streaming is a method of video streaming where the source content is encoded at multiple bit rates. Each of the different bit rate streams are segmented into small multi-second parts. The segment length can vary depending on the particular implementation, but they are typically between two and ten seconds. First, the client downloads a manifest file 400 (shown in FIG. 4) that describes the available stream segments (Segment #) and their respective bit rates (Bandwidth) related to the display of the segment at a given quality (Resolution).

FIG. 3A shows a typical relationship between a bandwidth available to user device 102 (client), the resolution of a decoded segment, and the resolution of the decoded segment in a display buffer (e.g., storage 228) of the user device 102. During stream start-up, the user device 102 may request the first segments of a media content item from the lowest bit rate stream (e.g., 480×360). Data from this stream is then decoded and stored in a display buffer at this resolution. If the client finds that the network throughput is greater than the bit rate of the downloaded segment, then it will request a higher bit rate segment. For example, where the bandwidth available to user device 102 is sufficient to stream HD content (e.g., 1080p), user device 102 requests an HD encoded stream from server 104. Later, if the client finds that the network throughput has deteriorated, it will request a lower quality encoded stream (e.g., 720p). An ABR algorithm is used by the client and/or the server, in combination with manifest file 400, to perform the function of deciding which encoded stream (e.g., which bit rate segments) to download, based on the current available bandwidth (and/or any other operational parameter relating to the operation of the user device 102). The above process is shown in FIG. 3A by the relationship between the bandwidth available, the decoded resolution and the playback buffer resolution. In particular, FIG. 3B shows an HD segment of a soccer game displayed between time T0 and T2. At time T1, the available bandwidth dropped such that an SD quality encoded stream is requested from server 104 (e.g., as specified by manifest file 400). Between time T1 and T2, the soccer game is displayed in HD quality from the playback buffer. However, at T2, playback switches to SD quality, as shown in FIG. 3C. Such a dramatic drop in display quality is detrimental to a user's QoE. For example, when a user is subjected to high quality display, it is undesirable when the quality unexpectedly and quickly drops to a much lower level. This might be because the user has seemingly taken good quality for granted. Moreover, an abrupt change of quality or resolution is undesirable. When a change in quality is expected, e.g., as a result of network congestion, a smooth transition at the display quality change is more acceptable, and thus improves the end user QoE. The systems and methods disclosed herein enable a smooth transition in perceived quality. For example, smaller quality variations between consecutive segments are more tolerable than larger jumps (e.g., from HD to SD) and, thus, have a less detrimental effect on the QoE of the user.

Figure 6A:
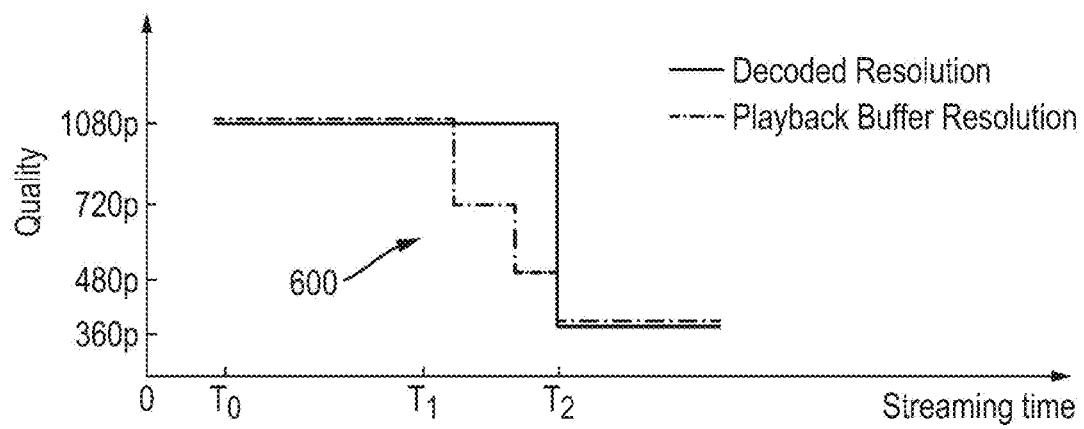
FIG. 6A illustrates a diagrammatic representation of quality variation during playback of a media content item, in accordance with some examples of the disclosure.
Figure 6B:
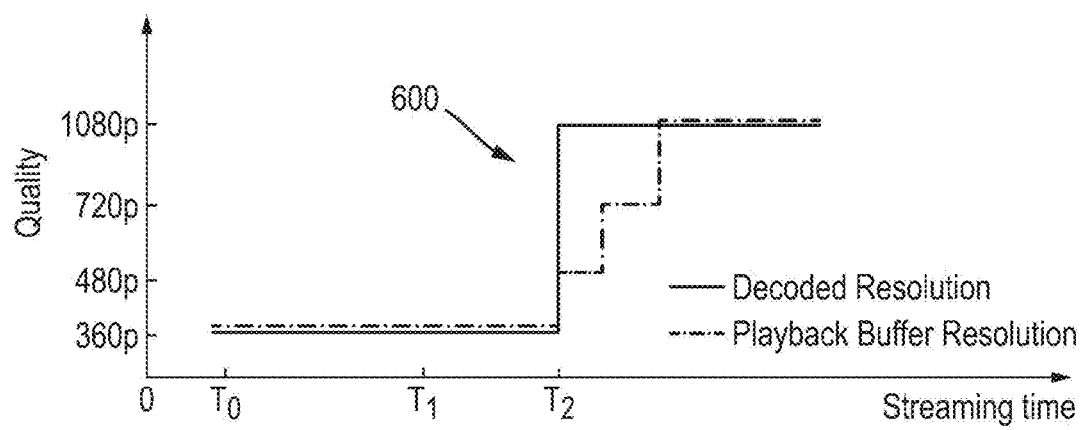
FIG. 6B illustrates a diagrammatic representation of quality variation during playback of a media content item, in accordance with some examples of the disclosure.

FIG. 5 is a flowchart representing an illustrative process 500 for streaming media content, in accordance with some examples of the disclosure. FIGS. 6A and 6B each show a resolution of decoded first and second portions of a media content item, and the resolution of the decoded first and second portions of a media content item in a display buffer (e.g., storage 228) of the user device 102 brought about by implementing process 500. In particular, FIG. 6A shows such a relationship when an available bandwidth decreases, and FIG. 6B shows such a relationship when an available bandwidth increases. While the examples shown in FIG. 5 and FIGS. 6A and 6B refer to the use of system 100, as shown in FIG. 1, it will be appreciated that the illustrative process shown in FIG. 5, and any of the other following illustrative processes, may be implemented on system 100, either alone or in combination with any other appropriately configured system architecture, such as system 200 shown in FIG. 2.

At 502, control circuitry receives a first portion of a media content item at a bandwidth available to a user device. The first portion may be any appropriate portion of the media content item, e.g., one or more scenes, segments or frames. In some examples, control circuitry of user device 102 may be configured to determine a current network bandwidth available for streaming a media content item (e.g., the soccer game) to the user device 102 and request, from server 104, one or more segments of the media content item at that bandwidth, e.g., based on information contained in manifest file 400. For example, when the available bandwidth is high, "Representation ID=3" having a high quality (e.g., 1080p) may be requested for a particular segment number (see FIG. 4). As such, the quality of the first portion, e.g., the quality of the encoded stream for displaying the first portion, received from server 104 is based on the bandwidth available at user device 102. Additionally, or alternatively, server 104 may be configured to determine the bandwidth available at user device 102, and transmit a certain encoded stream quality accordingly.

At 504, control circuitry receives a second portion of a media content item at a decreased or increased bandwidth. The second portion may be any appropriate portion of the media content item, e.g., one or more scenes, segments or frames. In some examples, control circuitry of user device 102 may be configured to determine a change in the network bandwidth available for streaming the media content item (e.g., the soccer game) to the user device 102 and request, from server 104, one or more segments of the media content item at that decreased or increased bandwidth, e.g., based on information contained in manifest file 400. For example, when the available bandwidth is low, "Representation ID=1" having a low quality (e.g., 360p) may be requested for a particular segment number (see FIG. 4). As such, the quality of the second portion, e.g., the quality of the encoded stream for displaying the second portion, received from server 104 is based on the decreased or increased bandwidth available at user device 102. Additionally, or alternatively, server 104 may be configured to determine the bandwidth available at user device 102, and transmit a certain encoded stream quality accordingly.

At 506, control circuitry is configured to determine the quality of the first portion and the quality of the second portion, e.g., based on information in manifest file 400 and/or information in the received encoded stream. In the context of the present disclosure, the term "quality" relates to one or more parameters used to describe the quality of the audio and/or visual playback of the first or second portion on user device 102. For example, the quality of the first/second portion may relate to its resolution. Additionally or alternatively, the quality of the first/second portion may relate to a video quality assessment (VQA). In some examples, control circuitry may access manifest file 400 and/or information embedded in the received stream to determine, e.g., without decoding the stream, the quality of the first portion and the quality of the second portion e.g., its resolution and/or its VQA. Alternatively, control circuitry may decode the received stream and determine its quality, e.g., based on one or more image processing techniques.

At 508, control circuitry is configured to compare the quality of at least one of the first and second portions to a quality threshold. For example, the quality threshold may be a resolution threshold, e.g., a target resolution, for the display of the media content item. For example, control circuitry may determine a resolution threshold, e.g., an average target resolution, such as 1080p, for the display of the media content item on user device 102. In some examples, the threshold resolution may be determined based on information in the manifest 400, an operational parameter of user device 102, e.g., a screen size, a parameter of the media content item being displayed, e.g., a type or genre of the media content item, and/or based on one or more settings in a user profile, e.g., related to a preferred resolution, and/or historic playback metrics of media content on the user device 102. In some examples, the quality threshold may be a VQA threshold. For example, a VQA of the first or second portion, e.g., created at encoding production, may be embedded in the received stream from server 104, and/or and accessible in the manifest 400. Additionally or alternatively, 508 may include comparing the quality of the first portion and the quality of the second portion. For example, control circuitry may be configured to compare a quality of the first portion (e.g., as determined from manifest file 400, or otherwise) to a quality of the second portion (e.g., as determined from manifest file 400, or otherwise). Additionally or alternatively, control circuitry may be configured to decode the first and second portions, and perform a comparison based on their respective qualities, e.g., based on one or more image processing techniques.

In particular, at 508, control circuitry is configured to compare the quality of the second portion received at the decreased bandwidth to a quality threshold. For example, the quality of the second portion may be a low resolution, e.g., an SD quality (360p), and a target resolution for the display of the media content item at user device 102 may be set to a high resolution, e.g., an HD quality (1080p). Based on the comparison of the resolution of the second portion received at the decreased bandwidth to the target resolution, control circuitry may determine that the quality of the second portion received at the lower bandwidth is less than the target resolution. In response, control circuitry reduces the quality of the first portion of the media content item prior to sending the first portion to a playback buffer, e.g., by processing a decoded version of at least some of the first portion.

Referring to FIG. 6A, control circuitry is configured to reduce, e.g., in a stepwise manner, the quality of the first portion prior to sending the first portion to a playback buffer. For example, adaptation to a decreased bandwidth occurs during streaming, e.g., at time T1 or before, when the bandwidth drops, and the quality of the received stream drops (e.g., from 1080p to 360p) to ensure continuous decoding and storage of the media content item in the playback buffer. Prior to a drop in the bandwidth, user device 102 has received a high quality encoded stream to allow storage and playback of the media content item at such a high quality, e.g., between T1 and T2, after which playback of the media content item switches to lower quality. As discussed above, with reference to FIGS. 3A-3C, typical streaming methods and systems aim to maximise the time at which a media content item is displayed at the highest available quality. However, such methods and systems can cause a large jump in the quality of the media content item displayed on a user device. The methods and systems disclosed herein are beneficial as they provide a smoother transition in the quality of the media content item displayed on a user device, e.g., without requiring retransmission of a reduced quality stream from server 104. In particular, control circuitry, e.g., of user device 102, is configured to process one or more scenes, segments or frames of the decoded first portion to reduce the quality of the first portion, prior to storage in a playback buffer. This means that quality variations can be achieved by a client-driven playout control mechanism, and that the adaptation to varying bandwidth can be completed by the server and client, while the client (e.g., user device 102) selects one or more scenes/segments/frames for continuous decoding to provide an improved transition in display qualities.

In the example shown in FIG. 6A, control circuitry is configured to reduce the quality of the first portion, e.g., the part of the first portion received after T1, in a stepwise manner from 1080p to 720p to 480p to 360p, e.g., between T1 and T2. In this manner, the viewer experiences a more gradual drop in the viewing quality of the media content item when bandwidth decreases, which can improve the QoE of the viewer. Put another way, user device 102 can determine how much of the first portion (e.g., 5 minutes or 50 segments) is available at a higher quality after a drop in the available bandwidth. In this manner, user device 102 can predict when the expected change in decoded picture quality will occur (e.g., after 5 minutes or 50 segments), and process the first portion (e.g., at least some of those 5 minutes or 50 segments) to provide a smoother transition to the playback at the lower quality (at time T2). Additionally or alternatively, control circuitry is configured to monitor the quality of the decoded media content item stored in a buffer, e.g., the playback buffer, and determine a duration of the media content item available at each of a first quality and a second quality. In some examples, control circuitry may determine a time at which playback will switch from playback of a first portion at a first quality to playback of a second portion at a second quality. In response to determining the time at which playback will switch, control circuitry may cause the quality of at least some of the received first and/or second portions to be modified, e.g., by processing at least some of decoded first and/or second portions stored in a buffer.

At 510, control circuitry is configured to operate in a similar manner to that described for 508. In particular, control circuitry is configured to compare the quality of the second portion received at the increased bandwidth to a quality threshold (see FIG. 6B). In some examples, the quality threshold used in 510 is different from the quality threshold used in 508. For example, quality threshold in 510 may be the quality at which the first portion was received, e.g., 360p—the quality of the currently displayed portion of the media content item. As such, when the quality of the second portion is received at a high resolution, e.g., an HD quality (1080p), the quality of the second portion may be compared to the quality of the first portion received at a lower resolution, e.g., an SD quality (360p), the quality of the second portion of the media content item may be reduced prior to sending the second portion to a playback buffer, since the quality of the second portion is greater than the quality of the first portion. In some examples, the quality threshold may be a difference between the quality of the first portion and a quality of the second portion. For example, the quality threshold may be set to a first, e.g., minimum, step in quality, e.g., a step in resolution from 360p to 480p. In such a case, control circuitry may be configured to determine that the difference between the quality of the first and second portions comprises a second step in quality, e.g., a step in quality of 360p to 1080p. As such, the quality of the second portion of the media content item may be reduced prior to sending the second portion to a playback buffer, since the difference between the quality step from the first portion and quality of the second portion is greater than the minimum step in quality.

In some examples, at 510, control circuitry may set a target resolution for the display of the media content item at user device 102 to a high resolution, e.g., an HD quality (1080p). Based on a comparison of the resolution of the second portion received at the increased bandwidth to the target resolution, control circuitry may determine that the quality of the second portion received at the higher bandwidth is equal to (or more) than the target resolution. In response, control circuitry reduces the quality of the second portion of the media content item prior to sending the second portion to a playback buffer, e.g., when the resolution of the first portion is less than the target resolution.

Referring to FIG. 6B, control circuitry is configured to reduce, from a maximum available quality, the quality of the second portion prior to sending the second portion to a playback buffer. For example, adaptation to an increased bandwidth during streaming, e.g., at time T1 or before, when the bandwidth increases, and the quality of the received stream increases (e.g., from 360p to 1080p). Prior to an increase in the bandwidth, user device 102 has received a low quality encoded stream, thus limiting playback of the media content item to such a low quality. Prior to time T2, the received stream quality increases such that the available decoded resolution increases, e.g., at time T2. As discussed above, with reference to FIGS. 3A-3C, typical streaming methods and systems aim to maximise the time at which a media content item is displayed at the highest available quality. As such, typical streaming methods and systems would switch to displaying the highest available quality as soon as possible, e.g., at T2. However, such methods and systems can cause a large jump in the quality of the media content item displayed on a user device. The methods and systems disclosed herein are beneficial as they provide a smoother transition in the quality of the media content item displayed on a user device, e.g., without requiring retransmission of a reduced quality stream from server 104. In particular, control circuitry, e.g., of user device 102, is configured to process one or more scenes, segments or frames of the decoded second portion to reduce the quality of the second portion, prior to storage in a playback buffer. This means that quality variations can be achieved by a client-driven playout control mechanism, and that the adaptation to varying bandwidth can be completed by the server and client, while the client (e.g., user device 102) selects scenes/segments/frames for continuous decoding to provide an improved transition in display qualities. In the example shown in FIG. 6B, control circuitry is configured to reduce the quality of the second portion, e.g., the part of the second portion received after an increase in bandwidth, in a stepwise manner from 1080p to 480p, and then 1080p to 720p, before maintaining quality at 1080p, e.g., at a predetermined period after T2, or as soon as the decoded second portion is available for reduced quality processing. In this manner, the viewer experiences a more gradual jump in the viewing quality of the media content item when bandwidth increases, which can improve the QoE of the viewer.

It will be appreciated that the exact resolutions, and resolutions steps, described in the description and figures herein are merely for the sake of example. Indeed, the manner in which the quality of the first or second portion may be reduced based on a quality reduction profile, which is described below in more detail. For the avoidance of doubt, any process or processes describe in relation to 508 may be implemented in 510, and vice versa.

The actions or descriptions of FIGS. 5, 6A and 6B may be used with any other example of this disclosure, e.g., the example described below in relation to FIGS. 7A and 7B. In addition, the actions and descriptions described in relation to FIGS. 5, 6A and 6B may be done in any suitable alternative orders or in parallel to further the purposes of this disclosure.

Figure 7A:
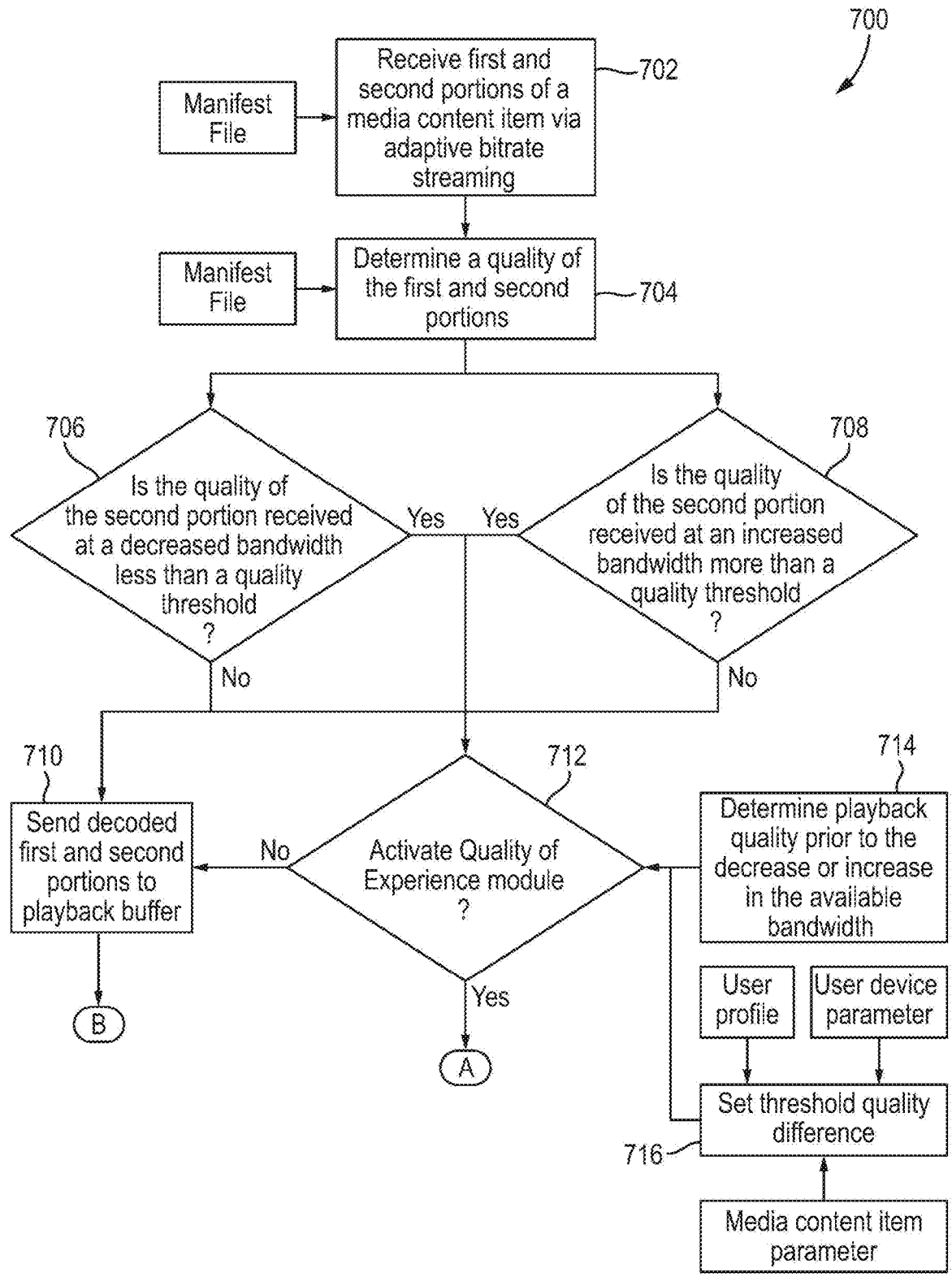
FIG. 7A is a flowchart representing a process for streaming media content, in accordance with some examples of the disclosure.
Figure 7B:
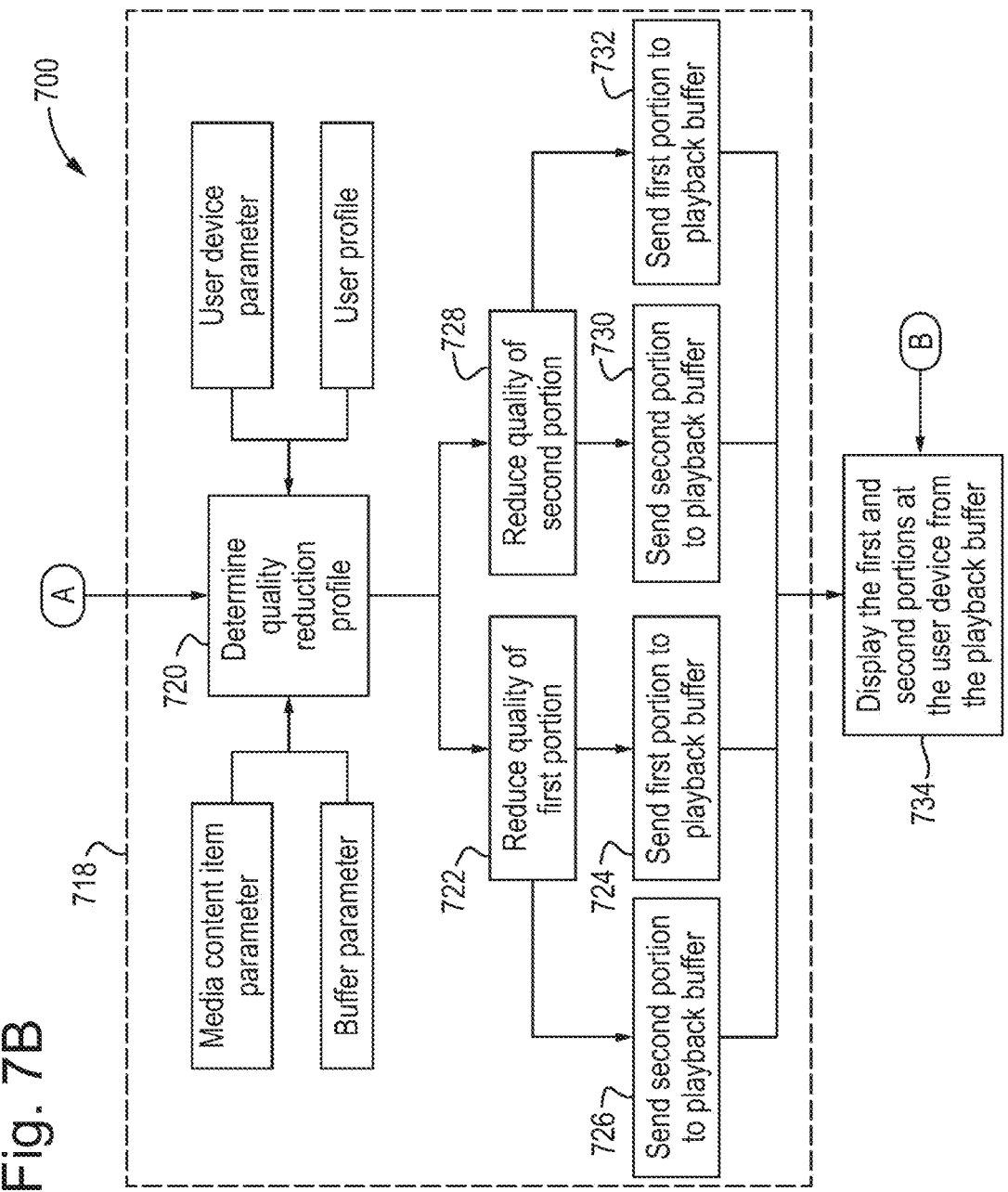
FIG. 7B is a continuation of the flowchart shown in FIG. 7A.

FIGS. 7A and 7B show a flowchart representing another process for streaming media content, in accordance with some examples of the disclosure. While the example shown in FIGS. 7A and 7B refers to the use of system 100, as shown in FIG. 1, it will be appreciated that the illustrative process shown in FIGS. 7A and 7B, and any of the other following illustrative processes, may be implemented on system 100, either alone or in combination with any other appropriately configured system architecture, such as system 200.

At 702, control circuitry, e.g., control circuitry 218 of user device 102, receives first and second portions of a media content item via adaptive bitrate streaming, e.g., in a similar manner to that described in 502 and 504 of process 500. For example, control circuitry 218 may access manifest file 400 to determine a quality at which to request each of the first and second portions of the media content item.

At 704, control circuitry, e.g., control circuitry 218 of user device 102, determines, e.g., records or logs in a database, the quality of each of the first and second received portions. For example, control circuitry may determine the quality of one or more scenes, segments or frames of each of the first and second portions received at corresponding bandwidths. In particular, control circuitry may parse manifest file 400 and store, e.g., in a database, a resolution value (and/or any other appropriate measure of quality, such as a VQA) for one or more scenes, segments or frames of each of the first and second portions of the media content item, and, optionally, the bandwidth at which each scene, segment or frame was received. In this manner, control circuitry may determine when, e.g., at which scene, segment or frame, the display of the media content item will change in quality, e.g., based on how many scenes, segments or frames of the first or second portion are stored in a buffer at a particular quality. For example, control circuitry may determine, following (or in response to) a decrease in available bandwidth, that 250 segments of the first portion are available, e.g., in a buffer, for playback at high quality (e.g., 1080p), and 450 segments of the second portion are available, e.g., in a buffer, for playback at a low quality (e.g., 360p). In some examples, control circuitry is configured to analyse a buffer to determine when a change in the display quality will occur, e.g., when display will switch from the display of the first portion to the display of the second portion.

At 706, control circuitry, e.g., control circuitry 218 of user device 102, determines whether the quality of the second portion received at a decreased bandwidth is less than a quality threshold, e.g., in a similar manner to that described in 508 of process 500.

In response to determining that the quality of the second portion received at the decreased bandwidth is not less than the quality threshold, process 700 moves to 710. In response to determining that the quality of the second portion received at a decreased bandwidth is less than the quality threshold, process 700 moves to 712.

At 708, control circuitry, e.g., control circuitry 218 of user device 102, determines whether the quality of the second portion received at an increased bandwidth is more than a quality threshold, e.g., in a similar manner to that described in 510 of process 500. In response to determining that the quality of the second portion received at the increased bandwidth is not more than the quality threshold, process 700 moves to 710. In response to determining that the quality of the second portion received at a decreased bandwidth is more than the quality threshold, process 700 moves to 712.

At 710, control circuitry, e.g., control circuitry 218 of user device 102, sends the first and second portions to a playback buffer for playback on user device 102, e.g., without modification of quality of the first or second portion. In some examples, control circuitry decodes the first and second portions after 706 or 708. In other examples, decoding of the first and second portions occurs when the first and second portions are received, e.g., after 702. Decoded first and second portions may be stored in a buffer, e.g., a playback buffer or another intermediary buffer. The decoded first and second portions may then be displayed from the playback buffer, e.g., at 734 (see arrow B).

At 712, control circuitry, e.g., control circuitry 218 of user device 102, determines whether to activate a QoE module, such as processing circuitry 230, e.g., in response to a positive determination at 706 or 708. For example, in some cases, it is beneficial to process automatically the first or second portion to reduce its quality, e.g., in response to the user device 102 requesting a portion of the media content item at a different quality. In other words, the smoothing in the transition between high and low qualities may be performed by default. However, in other cases, it is beneficial to determine whether or not to process the first or second portion to reduce its quality by default, since such processing requires some computational capacity. As such, at 712, control circuitry determines whether a QoE module should be activated, e.g., to optimize computation efficiency of the user device 102. For example, performing a quality reduction process might not be warranted in all situations. The QoE module is configured to cause the quality of at least some of the first portion or the second portion to be reduced, e.g., by processing a decoded and stored version of at least some of the first portion or the second portion. In order to determine, e.g., from a computational capacity standpoint, whether the QoE should be activated, control circuitry may analyse how the media content item quality has varied over a period preceding the decrease or increase of the quality of the received portion of the media content item.

At 714, control circuitry, e.g., control circuitry 218 of user device 102, determines playback quality, either directly based on the resolution or inferred based on the requested bit rate, prior to the decrease or increase in the available bandwidth. In some examples, control circuitry monitors the available bandwidth and stores a record of the available bandwidth as a function of time. In this manner, control circuitry can determine fluctuations in the bandwidth available at user device 102, e.g., over the period preceding the decrease or increase of the quality of the received portion of the media content item. In some examples, control circuitry is configured to determine how many times the bit rate of the media content item received at the user device 102 changed during a predetermined period, e.g., 10 minutes, or since the start of the display of the media content item. For example, control circuitry 218 of the user device 102 may be configured to determine that the bit rate of the received media content item switched a certain number of times, e.g., 5 times, since the start of the media content item, and compare that number of bit rate switches to a threshold switching value for the number of switches allowed before the QoE is activated. For example, the bit rate may switch a couple of times during the initial portion of the media content item, e.g., due to the computational capacity of the user device 102, and then settle to a steady bit rate (and continued streaming at a target resolution). In such cases where the determined number of bitrate switches is less than the threshold switching value, the QoE is not activated. Conversely, where the determined number of bit rate switches is more than the threshold switching value, the QoE may be activated. Additionally or alternatively, control circuitry 218 of the user device 102 may be configured to determine the highest and lowest requested bit rates within the predetermined period. For example, control circuitry may determine, e.g., based on information in manifest file 400, that the highest requested bit rate was 7.5 Mbps (e.g., see "Bandwidth=High" for "Representation ID=3" in FIG. 4) and the lowest requested bit rate was 3.5 Mbps (e.g., see "Bandwidth=Med" for "Representation ID=2" in FIG. 4), and compare the difference between the highest and lowest requested bit rates (e.g., 4 Mbps) to a threshold bit rate difference value allowed before the QoE is activated (e.g., 5 Mbps). In such cases where the determined difference in the between the highest and lowest received bit rates is less than the threshold bit rate difference value, the QoE is not activated. Conversely, the determined difference in the between the highest and lowest received bit rates is more than the threshold bit rate difference value, the QoE may be activated. In other words, the QoE module determines whether one or more jumps in the quality of the display of the media content item are frequent and/or large enough to warrant the activation of the QoE module. In this manner, activation of the QoE module may be reserved for circumstances where the QoE of the viewing of the media content item is likely to be significantly affected by fluctuation in the available bandwidth.

In the example shown in FIG. 7A, activation of the QoE is based on a threshold quality difference, in addition to or alternative from 714. For example, at 716 a threshold quality difference is set, e.g., based on a setting in a user profile, a parameter of the user device 102, and/or a parameter of the media content item. Referring back to 706 and 708, control circuitry compares the quality of the first portion and the quality of the second portion to a threshold quality difference. At 716, the QoE module determines whether the difference between the quality of the first/second portions and the quality threshold is greater than the threshold quality difference. For example, control circuitry may determine whether the quality of the second portion received at the decreased bandwidth is less than the quality threshold by more than a certain extent. Similarly, control circuitry may determine whether the quality of the second portion received at the increased bandwidth is more than the quality threshold by more than a certain extent. In this manner, activation of the QoE module can be tuned based on one or more other settings, so as to not activate by default. In some examples, the threshold quality difference may be set such that that the QoE module is activated based on a parameter of the user device 102, e.g., the threshold quality difference may be tuned based on how and what the user is viewing. For example, the QoE module may be set to activate, e.g., by default, when the user is watching the media content item on a TV (low threshold quality difference), but not on a tablet (high threshold quality difference). In some examples, e.g., where the QoE module is provided in a set top box, control circuitry maybe configured to determine a parameter, such as a size or resolution capability, of a display on which the user is watching the media content item, and activate the QoE accordingly. For example, where the user device 102 is an HD TV the threshold quality difference may be set to a low value, and where the user device 102 is an mobile device the threshold quality difference may be set to a high value. Additionally or alternatively, control circuitry maybe configured to determine the type (e.g., the genre) of the media content item being streamed. For example, control circuitry may determine whether the media content item is a fast-paced action movie or a sports game, in which case the QoE may be activated, e.g., based on a low threshold quality difference, as opposed to a slow-paced documentary or a webinar, in which case the QoE would not be activated, e.g., based on a high threshold quality difference. Additionally or alternatively, the threshold quality difference may be based on a setting in the user profile, such as a user preference for the frequency and/or size of the bit rate switches, a preference related to the type (e.g., genre) of the media content item, and/or a preference related to the type of user device 102. For example, a user might set the QoE module to activate when watching sport on a large TV (low threshold quality difference), but not when on a video call on a mobile device (high threshold quality difference). In other words, the QoE module determines whether to consume operational capacity of the user device 102 based on the context in which the user is viewing the media content item, and/or what content is being viewed. In this manner, activation of the QoE module may be reserved for circumstances where the QoE of the viewing of the media content item is likely to make a significant difference to the user's viewing experience, since different users will have different thresholds and reasons for their QoE being affected by jumps in quality. Thus, when control circuitry determines to not activate the QoE module, process 700 moves to 710, and when control circuitry determines to activate the QoE module, process 700 moves to 718 (see arrow A).

At 718, the QoE module is activated, e.g., to cause a reduction in the quality of the first or second portion of the media content item and display of the first or second portion of the media content item at that reduced quality. When activated, at 720, the QoE module is configured to determine a quality reduction profile (see 600 on FIGS. 6A and 6B and 800 on FIGS. 8A and 8B) for the first or second portion.

Figure 8A:
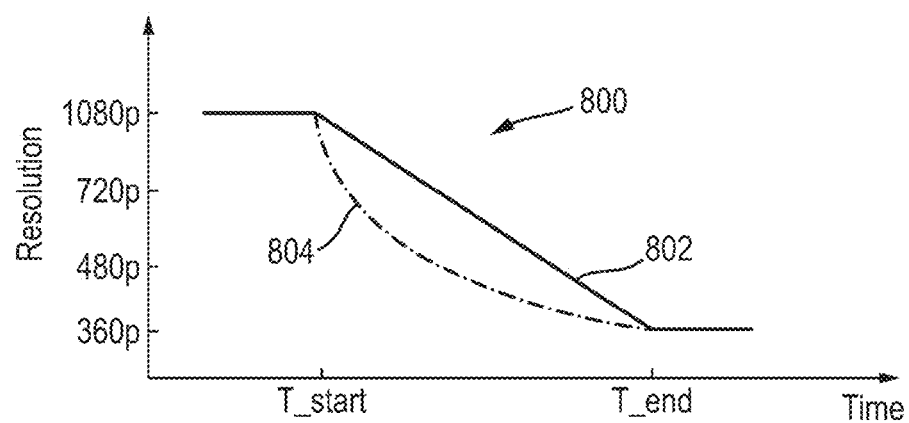
FIG. 8A shows how the quality of a first portion of a media content item may be reduced according to a quality reduction profile, in accordance with some examples of the disclosure.
Figure 8B:
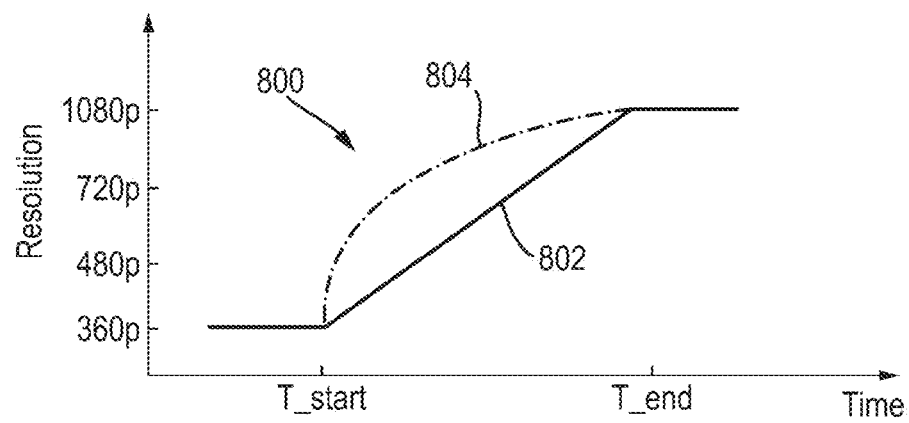
FIG. 8B shows how the quality of a second portion of a media content item may be reduced according to a quality reduction profile, in accordance with some examples of the disclosure

At 720, to determine the quality reduction profile, control circuitry, e.g., control circuitry 218 of user device 102, determines which of the first and second portion of the media content item is to be processed for quality reduction. For example, when the quality of the media content item drops owing to a decrease in available bandwidth, control circuitry selects the first portion for quality reduction processing. FIG. 8A shows example quality reduction profiles to reduce the quality of the first portion, thereby decreasing the display quality of the media content item. Conversely, when the quality of the media content item increases owing to an increase in available bandwidth, control circuitry selects the second portion for quality reduction processing. FIG. 8B shows example quality reduction profiles to reduce the quality of the second portion, thereby increasing the display quality of the media content item. In some examples, the quality reduction profile may be set, e.g., by default, to a reduction in quality as a function of time, e.g., between $T_{START}$ and $T_{END}$, such as a linear reduction 802 in quality as a function of time, or some other quality reduction profile, e.g., 804. In some examples, when the quality of the first portion is to be reduced, $T_{END}$, shown in FIG. 8A corresponds to time T2, shown in FIG. 6A, i.e., the time at which display of the media content item switches to low quality, and $T_{START}$ may correspond to time T1, or some other time following control circuitry determining (or predicting) and upcoming change in quality. In some examples, when the quality of the second portion is to be reduced, $T_{START}$, shown in FIG. 8A corresponds to time T2, shown in FIG. 6B, i.e., the time at which display of the media content item is available to display in high quality, and $T_{END}$ may correspond to some other predetermined time after T2. In the example shown in FIG. 6A, the quality reduction profile comprises a stepwise profile, where the quality of the first portion is reduced sequentially from 1080p, to 720p to 480p to 360p, such that the final step to 360p coincides with the decoded resolution of the media content item dropping to 360p, i.e., the start of the display of the second portion. In the example shown in FIG. 6B, the quality reduction profile comprises a stepwise profile, where the quality of the first portion is reduced sequentially from 1080p to 480p, then from 1080p to 760 such that the final step to 1080p involves no quality reduction. In this manner, the display of the second portion transitions from 360p, to 480p, to 720p, to 1080p.

In the example shown in FIG. 7B, determination of the quality reduction profile is based a media content item parameter, a buffer parameter, a user device parameter and/or a setting in a user profile. For example, the quality reduction profile may be based on the type (e.g., genre) of content being viewed. Additionally or alternatively, the quality reduction profile may be based on one or more factors relating to the scenes, segments or frames of the media content item stored in the buffer. For example, the quality reduction profile may be based on the number of scenes, segments or frames of the media content item stored in the buffer, e.g., where the buffer contains multiple scenes, a reduction in quality may be made to correspond to a change in scene, or where the media content item is a soccer game, a reduction in quality may be made to correspond to a change in a camera angle, or certain passage of play, such as a period of attack or defence. In some examples, where the media content item is a webinar or video conference, a reduction in quality may be made at a transition in speaker or presentation of a slideshow. Additionally or alternatively, the quality reduction profile may be based on one or more i-frames of the media content item. In some examples, the quality reduction profile may be based on one or more parameters relating to operation of the user device 102. For example, the quality reduction profile may be determined based on a computational capacity of the user device 102, e.g., the processing of the media content item to reduce its quality may be timed to not coincide with one or more other processes of the user device 102. In particular, the processing of the media content item to reduce its quality may be prevented, or postponed, when processing of the media content item would be detrimental to one or more other operations of the user device 102, such as causing a decrease in the quality of the requested stream. In some examples, the quality reduction profile may be based on one or more settings in a user profile, e.g., a setting relating to how the user prefers to implement a quality smoothing process.

At 722, control circuitry, e.g., control circuitry 218 of user device 102, processes at least some of the first portion to reduce its quality according to the determined quality reduction profile. The quality reduction may be performed in any appropriate manner, e.g., by applying a bandwidth reduction and/or a sample rate reduction, or in a manner similar to that described in 508 of process 500.

At 724, control circuitry, e.g., control circuitry 218 of user device 102, sends the reduced quality first portion to the playback buffer.

At 726, control circuitry, e.g., control circuitry 218 of user device 102, sends the second portion to the playback buffer, e.g., without modification to its quality. Alternatively, the second portion may be sent to the playback buffer in between 706 and 712.

At 728, control circuitry, e.g., control circuitry 218 of user device 102, processes at least some of the second portion to reduce its quality according to the determined quality reduction profile. The quality reduction may be performed in any appropriate manner, e.g., by applying a bandwidth reduction and/or a sample rate reduction, or in a manner similar to that described in 510 of process 500.

At 730, control circuitry, e.g., control circuitry 218 of user device 102, sends the reduced quality second portion to the playback buffer.

At 732, control circuitry, e.g., control circuitry 218 of user device 102, sends the first portion to the playback buffer, e.g., without modification to its quality. Alternatively, the first portion may be sent to the playback buffer in between 706 and 712.

At 734, control circuitry, e.g., control circuitry 218 of user device 102, displays the first and second portions in a manner that smooths the transition in quality between the two portions, such that the viewer does not experience a large and sudden change in the quality of the viewed media content item, thus increasing their QoE.

The actions or descriptions of FIGS. 7A and 7B may be used with any other example of this disclosure. In addition, the actions and descriptions described in relation to FIGS. 7A and 7B may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of streaming media content, the method comprising:
   receiving, using control circuitry, a first portion of a media content item at a bandwidth available to a user device, wherein the first portion has a first quality based on the bandwidth available;
   receiving, using control circuitry at a current time, a second portion of the media content item at a decreased bandwidth, wherein the second portion has a second quality based on the decreased bandwidth available to the user device;
   determining, using control circuitry, a first time at which play of the first portion with the first quality will end and a switch in play quality to the second portion of the media content item at the second quality will occur, wherein the first time occurs after the current time; and applying, using control circuitry, a quality reduction profile to the first quality of the first portion, wherein the quality reduction profile reduces play quality of the first portion of the media content from the first quality to the second quality by reducing a resolution of the first portion of the media content item over a plurality of intermediary steps prior to the switch in play quality to the second portion of the media content at the second quality, and wherein the quality reduction profile includes a function for determining a time for each of the plurality of intermediary steps in the reduction of play quality.

2. The method according to claim 1, wherein the reduction in the first quality of the first portion is made prior to sending the first portion to a buffer.

3. The method according to claim 1, wherein the reduction in the quality of the first portion is performed based on analysis of the quality of playback of the media content item in a period preceding the decreased quality of decoded data bandwidth available to the user device.

4. The method according to claim 1, the method comprising:
determining a time at which the bandwidth available to the user device decreases, wherein the quality reduction profile is further based on the time at which the bandwidth available to the user device decreases.

5. The method according to claim 1, wherein the quality reduction profile is based on at least one of:
an amount of the first portion or the second portion in a buffer;
a period between the time at which a switch in play quality of the media content will occur and the time at which the bandwidth available to the user device decreases;
a type of the media content item;
a number of scenes, segments or frames of the first portion or the second portion;
an interframe coding of the first portion or the second portion; or
an operational parameter of the user device.

6. The method according to claim 1, wherein the quality reduction profile comprises a stepwise profile or a linear profile.

7. The method according to claim 1, the method comprising:
in response to determining that the second quality of the second portion received at the decreased bandwidth is less than a quality threshold, reducing the first quality of the first portion of the media content item according to the quality reduction profile.

8. The method according to claim 7, wherein the quality threshold comprises a threshold quality difference between the quality of the first portion and a target resolution, the method comprising:
reducing the first quality of the first portion in response to determining that the difference between the first quality of the first portion is greater than the threshold quality difference.

9. The method according to claim 7, wherein the quality threshold comprises a threshold quality difference between the first quality of the first portion and the second quality of the second portion, the method comprising:
determining a difference between the first quality of the first portion and the second quality of the second portion; and
reducing the quality of the first portion, in response to determining that the difference between the first quality of the first portion and the second quality of the second portion is greater than the threshold quality difference.

10. The method according to claim 1, the method comprising:
activating a quality of experience module in response to:
determining that the second quality of the second portion received at the decreased bandwidth is less than a quality threshold; wherein
the quality of experience module is configured to:
determine the quality reduction profile; and
cause the reduction in the quality of the first portion of the media content item and a display of the first portion of the media content item at that reduced quality.

11. A media content streaming system comprising memory and a system control circuitry, the system control circuitry configured to:
receive a first portion of a media content item at a bandwidth available to a user device, wherein the first portion has a first quality based on the bandwidth available and stored in the memory;
receive at a current time, a second portion of the media content item at a decreased bandwidth, wherein the second portion has a second quality based on the decreased bandwidth available to the user device;
determine a first time at which play of the first portion with the first quality will end and a switch in play quality to the second portion of the media content item at the second quality will occur, wherein the first time occurs after the current time; and
apply a quality reduction profile to the quality of the first portion, wherein the quality reduction profile reduces play quality of the first portion of the media content from the first quality to the second quality by reducing a resolution of the first portion of the media content item over a plurality of intermediary steps prior to the switch in play quality to the second portion of the media content at the second quality, and wherein the quality reduction profile further includes a function for determining a time for each of the plurality of intermediary steps in the reduction of play quality.

12. The system according to claim 11, wherein the system control circuitry is configured to cause the reduction in the quality of the first portion prior to sending the first portion to a buffer.

13. The system according to claim 11, wherein the system control circuitry is configured to perform the reduction in the quality of the first portion based on analysis of the quality of playback of the media content item in a period preceding the decreased bandwidth available to the user device.

14. The system according to claim 11, wherein the system control circuitry is configured to:
determine a time at which the bandwidth available to the user device decreases, wherein the quality reduction profile is further based on the time at which the bandwidth available to the user device decreases.

15. The system according to claim 11, wherein the quality reduction profile is based on at least one of:
an amount of the first portion or the second portion in a buffer;
a period between the time at which a switch in play quality of the media content will occur and the time at which the bandwidth available to the user device decreases;
a type of the media content item;
a number of scenes, segments or frames of the first portion or the second portion;

an interframe coding of the first portion or the second portion; or an operational parameter of the user device.

16. The system according to claim 11, wherein the quality reduction profile comprises a stepwise profile or a linear profile.

17. The system according to claim 11, wherein the system control circuitry is configured to:
   in response to determining that the second quality of the second portion received at the decreased bandwidth is less than a quality threshold, reduce the first quality of the first portion of the media content item according to the quality reduction profile.

18. The system according to claim 17, wherein the quality threshold comprises a threshold quality difference between the quality of the first portion and a target resolution, wherein the system control circuitry is configured to:
   reduce the quality of the first portion in response to determining that the difference between the quality of the first portion is greater than the threshold quality difference.

19. The system according to claim 17, wherein the quality threshold comprises a threshold quality difference between the first quality of the first portion and the second quality of the second portion, wherein the system control circuitry is configured to:
   determine a difference between the first quality of the first portion and the second quality of the second portion; and
   reduce the quality of the first portion, in response to determining that the difference between the first quality of the first portion and the second quality of the second portion is greater than the threshold quality difference.

20. The system according to claim 11, wherein the system control circuitry is configured to:
   activate a quality of experience module in response to:
   determine that the second quality of the second portion received at the decreased bandwidth is less than a quality threshold; wherein
   the quality of experience module is configured to:
   determine the quality reduction profile; and
   cause the reduction in the quality of the first portion of the media content item and a display of the first portion of the media content item at that reduced quality.

* * * * *